April 14, 1970 H. S. BORKOVITZ 3,506,855

POWER CONTROL CIRCUIT

Original Filed March 1, 1966

INVENTOR
HENRY S. BORKOVITZ
BY
Baldwin, Doan & Egan
ATTORNEYS

United States Patent Office 3,506,855

Patented Apr. 14, 1970

3,506,855

POWER CONTROL CIRCUIT

Henry S. Borkovitz, 1412 W. Thorndale Ave., Chicago, Ill. 60626

Original application Mar. 1, 1966, Ser. No. 530,982, now Patent No. 3,295,020, dated July 13, 1966. Divided and this application Aug. 22, 1966, Ser. No. 589,782
Int. Cl. H03k *17/26*
U.S. Cl. 307—293 1 Claim

ABSTRACT OF THE DISCLOSURE

A power control circuit for controllably pulse-firing a semiconductor voltage source effective to control the application of current to a connected load and which circuit includes a first transistor to which a control signal is applied. A second transistor connected to the first transistor forms a part of a time delay circuit which regulates the buildup of current in the first transistor. A third transistor connected to the second transistor is operable at the expiration of the time delay as determined by the time-delay circuit to pulse-fire a unijunction transistor which, when turned on, operates to pulse control and turn on the semiconductor voltage source.

This application is a division of copending application Ser. No. 530,982, filed Mar. 1, 1966, now U.S. Patent 3,295,020, granted July 13, 1966.

U.S. application Ser. No. 530,982 is a continuation-in-part of application Ser. No. 245,754, filed Dec. 19, 1962, now abandoned.

This invention relates to a power control circuit and more particularly to an electronic circuit utilizing semiconductor rectifiers, or similar electrcal valves, to control the flow of electric power to a load.

Electric power control circuits of the type to which the present invention relates have heretofore been proposed and have been used satisfactorily for controlling the supply of power to many different types of loads. Circuits of this type are more particularly described and claimed in my copending applications Ser. No. 138,885, filed Sept. 18, 1961, now U.S. Patent No. 3,102,226 issued Aug. 27, 1963, and Ser. No. 155,421 filed Nov. 28, 1961, now abandoned.

Two difficulties have been encountered in such circuits, one of which occurs when the load is a transformer or similar inductive device due to the inrush of current to the load when power is initially supplied to the load. This creates a very high current flow and may damage the control circuit or cause a false overload indication thereon. The other difficulty is due to false overload indication in response to transients in the power supply. The principal object of the present invention is to provide a power control circuit in which these two difficulties are overcome.

Another object is to provide a power control circuit in which the rate of buildup of the controlling signal is limited by time delay devices, thereby limiting the rate at whch the load current can increase. This will eliminate the possibility of damage due to initial inrush of current to a transformer or similar load.

Another object is to provide a power control circuit in which time delay means are provided in the overload control so that it cannot respond to transients of short duration.

The above and other objects and features of the invention will be more readily apparent from the following description when read in connection with the accompanying drawings, in which.

Figure 1:
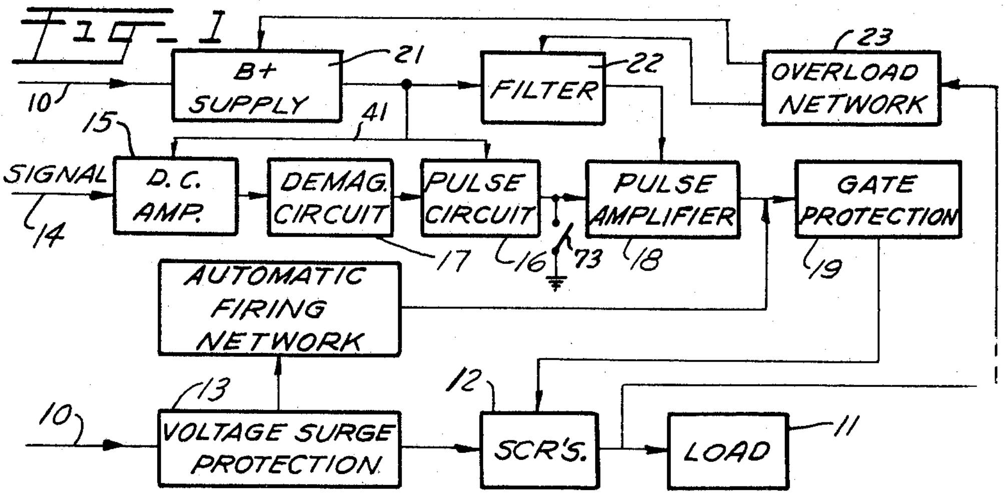
FIG. 1 is a block diagram of a circuit embodying the invention.

Referring first to the block diagram, the circuit is powered from a source 10 and supplies a load 11 through one or more semiconductor rectifiers 12. The semiconductor rectifiers are connected between the source and the load through a voltage surge protection circuit 13. Controlling signals are supplied from any suitable type of instrument responsive to the condition to be controlled through a connection 14 to a D.C. amplifier 15 which supplies a pulse circuit 16 through a demagnetizing or time delay circuit 17. The pulses from the pulse circuit 16 are amplified in a pulse amplifier 18 and supplied to a gate protection unit 19 which is connected, as shown, to the semiconductor rectifiers 12 to supply controlling pulses thereto.

The D.C. amplifier 15 and pulse circuit 16 are supplied with power from a B plus supply source 21 which also supplies a filter circuit 22 through which power is supplied to the pulse amplifier 18. An overload network 23, which is responsive to the load current, controls the B plus supply and the filter circuit 22 to make the pulse supply circuit inoperative in the event of overload.

Figure 2:
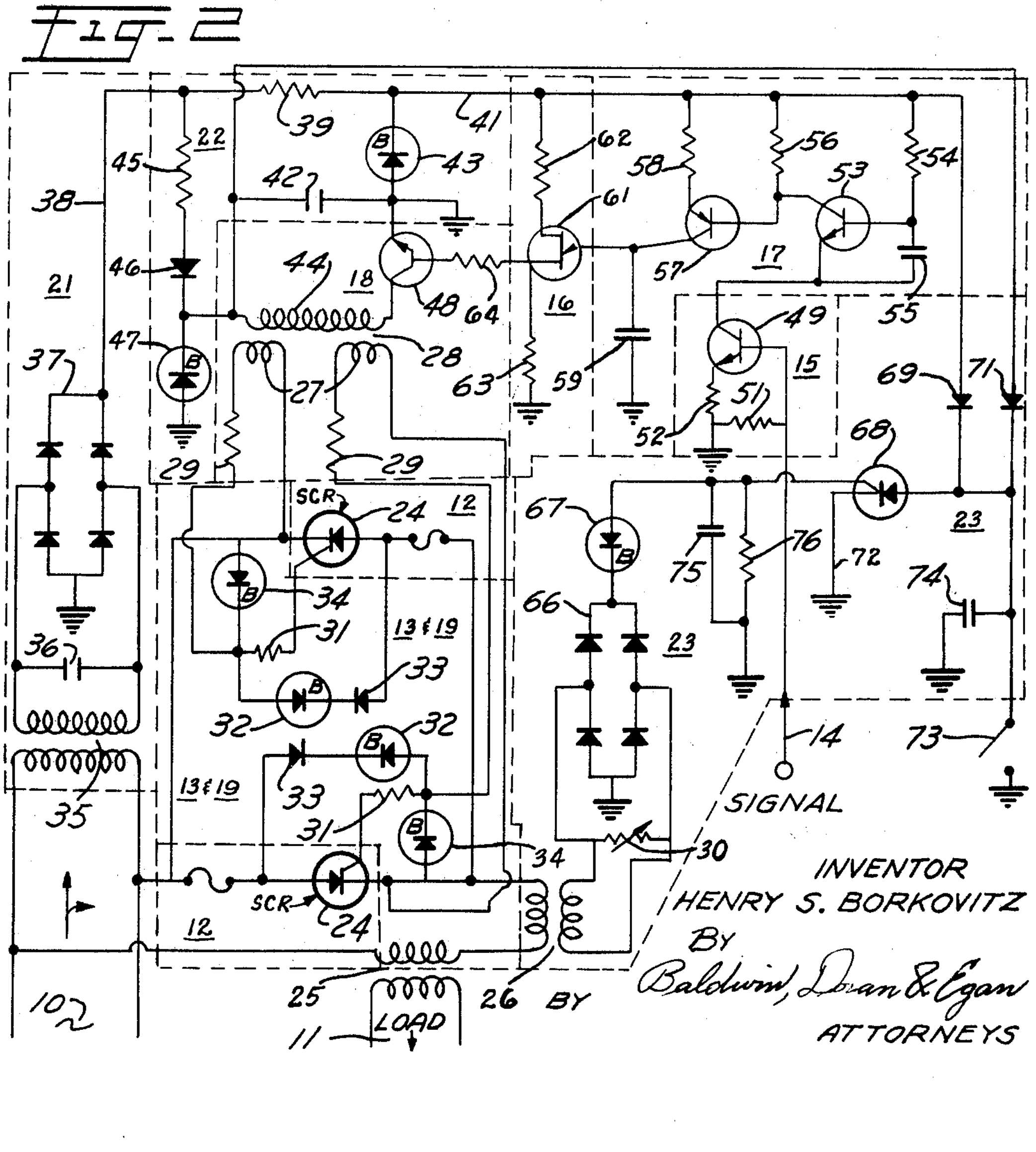
FIG. 2 is a circuit diagram.

The actual circuit, as shown diagrammatically in FIG. 2, includes a double semiconductor rectifier unit for full phase utilization of an alternating current power supply. It will be understood that two such units could be employed, as disclosed in my Patent No. 3,102,226, and further that multiple phase power could be controlled by the provision of additional units for each of the phases.

The semiconductor rectifier unit, as shown in FIG. 2, includes two semiconductor control rectifiers 24 connected in parallel in opposing relationship with each other between one side of the power source 10 and the load 11. As shown, the other side of the power source is connected through a transformer 25 which supplies the load and through a current transformer 26 to the semiconductor control rectifiers. Each of the rectifiers 24 is of a conventional construction, including current conductive electrodes between which the load current flows and a control or gating electrode which makes the rectifier conductive in one direction when a positive voltage pulse is supplied thereto and when a voltage of the correct phase is impressed across the current conductive electrodes. The semiconductor rectifiers 24 are supplied with pulses from secondary windings 27 on a transformer 28 and which windings are connected respectively through resistors 29 and resistors 31 between the control electrodes and cathodes of the semiconductor rectifiers. The transformer 28 is supplied with pulses by a control circuit to be described hereinafter to cause the semiconductor rectifiers to fire at different phase positions thereby to control the amount of power transmitted to the load by them.

The semiconductor rectifiers are protected against voltage surges by Zener diodes 32 connected in series with rectifiers 33 and with Zener diodes 34 in shunt across the semiconductor rectifiers 24 with the point between diodes 32 and 34 being connected through the resistors 31 to the control electrodes of the semiconductor rectifiers 24. In the event the voltage developed across either the semiconductor rectifiers 24 should become sufficient to cause flow of current through the shunt circuit, a signal will be supplied to the control electrode of the semiconductor rectifier 24 causing it to fire. The rectifier 24 thereupon becomes conductive regardless of the signal supplied thereto from the transformer 28 to prevent damage to the rectifier, the load normally being capable of absorbing small surge currents without damage. The Zener diodes 34 which as shown are connected across the transformer secondary windings 27 serve not only to bypass negative portions of the signal pulses so that the control electrodes will receive only positive voltage signals, but also function to limit the value of the positive voltage pulses.

The controlling pulses for the semiconductor rectifiers 24 are supplied through a pulse control circuit 16 which may be powered by B+ supply circuit 21 derived from the source 10 through a transformer 35. A capacitor 36 is preferably connected across the secondary of the transformer to bypass surges and transients. The secondary of the transformer supplies a full wave rectifier circuit 37 which is connected at one side to ground and at the other side to a power lead 38 for the pulse supplying circuit. The line 38 is connected through a resistor 39 to a line 41 which comprises the source 21 of regulated voltage for the D.C. amplifier 15 and pulse circuit 16. The ground for the rectifier circuit 37 as well as the other grounds shown are a control circuit common and not a chassis ground.

The voltage on the line 38 is supplied to one side of the primary winding 44 of the transformer 28 through a resistor 45 and a rectifier 46, a Zener diode 47 connecting said one side of the primary winding 44 to ground to regulate the voltage supplied to the winding. The winding 44 is connected in a closed loop pulse amplifier circuit 18 with the capacitor 42 which filters the voltage to the pulse amplifier 18 and with a transistor or similar electrical valve 48 so that when the valve 48 is conducting current can flow in the loop, as described hereinafter.

The valve 48 is controlled in response to a signal supplied at the inlet connection 14 to vary the phase position at which pulses are supplied to the semiconductor rectifiers thereby to control the phase position at which they will fire to control the power transmitted therethrough. For this purpose, the signal input lead 14 is connected to the control electrode of a transistor 49 of D.C. amplifier 15, a shunt resistor 51 being provided to establish a bias level. One of the current conducting electrodes of the transistor 49 is conected to ground through a resistor 52 and the other is connected to one of the current conducting electrodes of a transistor 53 forming a part of the demagnetizing or time delay circuit 17 to regulate the rate of buildup of the current supply. The control electrode of the transistor 53 is connected through a resistor 54 to the supply lead 41 and through a capacitor 55 to the common point between the transistors 49 and 53. The other current conducting electrode of the transistor 53 is connected to the supply lead 41 through a resistor 56 which is also connected to the control electrode of a transistor 57. The current conducting electrodes of the transistor 57 are connected respectively to the supply lead 41 through a resistor 58 and to ground through a capacitor 59. The point between transistor 57 and capacitor 59 is connected to the control electrode of a unijunction transistor 61 of pulse circuit 16 which is connected to the supply lead 41 through resistor 62 and to ground through resistor 63. The point between the transistor 61 and resistor 63 is connected through a resistor 64 to the control electrode of the transistor 48 of the pulse amplifier 18.

In operation of this circuit, as the signal builds up on the lead 14 the transistor 49 of D.C. amplifier 15 will become conductive. The transistor 53 cannot become conductive until the capacitor 55 is charged to a predetermined voltage and in this way the transistor 53 and the capacitor 55 form a time delay means 17 to limit the rate of buildup of the signal and hence the rate of buildup of the load current, after power is applied.

After the transistor 53 has become conductive, a voltage will be generated across the resistor 56 which is supplied to the control electrode of the transistor 57 to trigger it. As the transistor 57 becomes conductive, the capacitor 59 will be charged and when it reaches a predetermined voltage it will trigger the unijunction transistor 61 of the pulse circuit 16. Flow through this transistor 61 will develop a voltage across the resistor 63 which is applied to the transistor 48 of pulse amplifier 16 to trigger it. As soon as the transistor 48 becomes conductive a pulse of current will flow through the transformer primary winding 44 of the gate protection circuit 19 to generate pulses in the secondary windings 27 which are transmitted to the semiconductor rectifiers 24 to control them.

The overload protection circuit 23 is essentially similar to that more particularly described and claimed in my copending application Ser. No. 155,421, now abandoned. As shown, it comprises a full wave rectifier 66 connected to the secondary of the current transformer 26, and to the loading resistor 30. One side of the full wave rectifier is connected to ground and the other side is connected through a Zener diode 67 to the control electrode of a semiconductor controlled rectifier 68. The common terminal of the rectifier 68 is connected through a rectifier 69 to the power supply lead 41 and through a second rectifier 71 to the junction betwen the rectifier 46 and Zener diode 47. The other terminal of the rectifier 68 is connected to ground through a lead 72.

When the voltage across the rectifier circuit 66 exceeds the breakdown voltage of the Zener diode 67, the Zener diode 67 will transmit the voltage to the rectifier 68 which will then become conductive. The rectifier 68 will short circuit both the power supply lead 41 and the point of power supply to the transformer primary 44 so that under these conditions no pulses can be transmitted to the semiconductor rectifiers 24 to make them conductive and the circuit will be shut down. To restart the circuit, a switch 73 having a capacitor 74 in parallel therewith and shunting the semiconductor controlled rectifier 68 is temporarily closed to remove the voltage from the rectifier 68 so that it will again become nonconducting.

According to the present invention, time delay means are provided in the overload circuit to prevent it from responding to surges of transients produced from the power supply source. The capacitor 74 constitutes a part of such means and the remainder is made up of a capacitor 75 and resistor 76 connected in parallel to a point between the Zener diode 67 and the rectifier 68 and ground. Any transient pulses of short duration transmitted by the Zener diode 67 will be bypassed to ground through the capacitor 75 and resistor 76 and will not cause the rectifier 68 to fire. Thus false indications of overload due to short pulses or transients are eliminated.

While one embodiment of the invention has been shown and described herein, it will be understood that it is illustrative only and not to be taken as a definition of the scope of the invention, reference being had for this purpose to the appended claim.

What is claimed is:

1. A power control circuit comprising an electrical valve having current conductive electrodes and a control electrode, connections to the current conductive electrodes to impress a pulsating voltage thereacross, the valve becoming conductive when a predetermined voltage is applied to the control electrode and a voltage of predetermined value is impressed across the current conducting electrodes, a pulse circuit connected to the control electrode to supply actuating pulses thereto and including a second electrical valve having current conductive electrodes connected across a source of power and a control electrode connected to the source of the controlling signal, a third electrical valve having current conductive electrodes connected in series with the current conductive electrodes of the second valve and a control electrode connected through a capacitor to one of its current conductive electrodes, a fourth electrical valve controlled in response to the flow of current through the second and third electrical valves, a capacitor in series with the fourth electrical valve, and means responsive to the charge on the last named capacitor to control the supply of pulses to the control electrode of the first named electrical valve.

References Cited

UNITED STATES PATENTS

| | | | |
|---|---|---|---|
| 2,467,765 | 4/1949 | Mayle | 321—18 |
| 2,520,476 | 8/1950 | Stanback | 315—106 |
| 3,083,328 | 3/1963 | Mallery | 307—297 |
| 3,174,096 | 3/1965 | Lichowsky | 307—297 |
| 3,243,711 | 3/1966 | King | 307—297 |
| 3,249,805 | 5/1966 | McCabe | 307—297 |

DONALD D. FORRER, Primary Examiner

H. A. DIXON, Assistant Examiner

U.S. Cl. X.R.

307—297, 252